(12) United States Patent
Balling et al.

(10) Patent No.: US 11,342,815 B2
(45) Date of Patent: May 24, 2022

(54) EXCHANGEABLE TEMPERATURE DETECTION UNIT FOR A STATOR OF AN ELECTRIC MOTOR

(71) Applicant: VALEO SIEMENS EAUTOMOTIVE GERMANY GMBH, Erlangen (DE)

(72) Inventors: Florian Balling, Bad Neustadt (DE); Christian Finger-Albert, Bad Kissingen (DE); Stefan Oetzel, Schmalkalden (DE); Michael Menz, Hollstadt (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 238 days.

(21) Appl. No.: 16/555,386

(22) Filed: Aug. 29, 2019

(65) Prior Publication Data

US 2020/0076276 A1 Mar. 5, 2020

(30) Foreign Application Priority Data

Aug. 31, 2018 (DE) ...................... 10 2018 121 356.5

(51) Int. Cl.
| | |
|---|---|
| *H02K 11/25* | (2016.01) |
| *H02K 5/10* | (2006.01) |
| *H02K 5/15* | (2006.01) |
| *H02K 7/00* | (2006.01) |
| *G01K 1/02* | (2021.01) |
| *G01K 1/14* | (2021.01) |
| *B60K 1/00* | (2006.01) |

(52) U.S. Cl.
CPC ............. *H02K 11/25* (2016.01); *G01K 1/026* (2013.01); *G01K 1/14* (2013.01); *H02K 5/10* (2013.01); *H02K 5/15* (2013.01); *H02K 7/006* (2013.01); *B60K 1/00* (2013.01); *B60K 2001/006* (2013.01); *B60Y 2400/60* (2013.01)

(58) Field of Classification Search
CPC ................................. H02K 11/25; G01K 1/14
See application file for complete search history.

(56) References Cited

U.S. PATENT DOCUMENTS

| | | | |
|---|---|---|---|
| 6,541,888 B2 | 4/2003 | van Heyden et al. | |
| 7,501,728 B2* | 3/2009 | Knauff | H02K 3/522 310/194 |
| 8,475,136 B2* | 7/2013 | Jayanth | F04C 28/28 417/44.11 |
| 2002/0047355 A1* | 4/2002 | Hwang | H02K 41/03 310/68 C |
| 2002/0180577 A1 | 12/2002 | Heyden et al. | |
| 2006/0131968 A1* | 6/2006 | Groening | H02K 11/25 310/68 C |
| 2008/0094231 A1* | 4/2008 | Hohn | H02K 11/25 340/584 |

(Continued)

FOREIGN PATENT DOCUMENTS

| | | |
|---|---|---|
| CN | 205792061 U | 12/2016 |
| DE | 10002485 A1 | 8/2001 |

(Continued)

*Primary Examiner* — Dang D Le
(74) *Attorney, Agent, or Firm* — Manabu Kanesaka

(57) ABSTRACT

A temperature detection unit for a stator of an electric motor, includes a plate, a support element, at least two feet, and at least two temperature sensors, wherein the temperature sensors are arranged one on each of the feet.

9 Claims, 6 Drawing Sheets

(56) References Cited

U.S. PATENT DOCUMENTS

| | | | |
|---|---|---|---|
| 2009/0296777 A1* | 12/2009 | Fish .................... | H02P 9/302 |
| | | | 374/152 |
| 2010/0085002 A1* | 4/2010 | Knauff ................ | H02K 11/35 |
| | | | 318/490 |
| 2013/0084193 A1* | 4/2013 | Beers .................. | F04D 17/12 |
| | | | 417/44.1 |

FOREIGN PATENT DOCUMENTS

| | | |
|---|---|---|
| DE | 102015203435 A1 | 9/2016 |
| DE | 102016209457 A1 | 11/2017 |
| DE | 102016214032 A1 | 2/2018 |

* cited by examiner

EXCHANGEABLE TEMPERATURE DETECTION UNIT FOR A STATOR OF AN ELECTRIC MOTOR

RELATED APPLICATIONS

The present application is based on, and claims priority from, German Application No. 10 2018 121 356.5 filed Aug. 31, 2018, the disclosure of which is hereby incorporated by reference herein in its entirety.

The invention relates to an exchangeable temperature detection unit for a stator of an electric motor.

PRIOR ART

Electric motors are generally known and are being used increasingly to drive vehicles. An electric motor consists of a stator and a rotor.

The stator comprises a plurality of slots, in which the windings are guided. The windings converge and are connected in the winding head. It is necessary for the operation of the electric motor to monitor the temperature in the stator. This can be achieved by measuring the temperature of the windings or of the winding head.

Problem and Solution

The object of the present invention is to provide an exchangeable temperature detection unit with which the temperature of the winding head in the stator can be determined efficiently.

In accordance with the invention a temperature detection unit for a stator of an electric motor comprises a plate, a support element, at least two feet, and at least two temperature sensors, wherein the temperature sensors are arranged one on each of the feet.

With this design of the temperature detection unit, the temperature sensors can be removed from the stator or end shield, for example following a defect, or for example can be inserted into the stator or the end shield only following connection of the windings.

At least one sealing element can preferably be arranged on the plate, wherein the sealing element has a region extending beyond the plate.

The infiltration of moisture between winding head and temperature sensors is prevented by way of the sealing element. This increases the operational reliability.

In a further embodiment of the invention the feet may each have a recess, and at least one temperature sensor may be arranged in said recesses.

The recesses can be open in the direction of the winding head and embed the temperature sensors. On the one hand a direct contact between the winding head and the temperature sensors is thus possible, and on the other hand the temperature sensors are enclosed by the feet on the side facing away from the winding head.

In a further preferred embodiment of the invention a further sealing element can be arranged between the plate and the support element.

This further sealing element increases the resistance of the plate to moisture.

A channel can preferably run through the feet and the support element penetrating the plate and a conductor can be guided in this channel.

The signals from the temperature sensors can thus be forwarded through the plate to an external control unit.

The signals can then be processed outside the stator or electric motor.

A cross member can further preferably be arranged between the support element and the feet, and the cross member distances the feet from one another.

With spaced-apart feet, for example the temperature of windings on different sides of the state can be measured. For example, a temperature measurement is taken on the inner side of the winding head and also on the outer side of the winding head.

With spaced-apart feet the temperature of windings that are fed by different phases of an inverter can be measured alternatively.

In a further embodiment of the invention the temperature detection unit can have three feet with three temperature sensors. Two feet are arranged oppositely, with one further foot next to another foot. With this embodiment the temperature in the inner and outer diameter of the winding head and also the temperature of adjacent windings fed with different phases can be measured. This, for example, represents a combination of the embodiment with the oppositely arranged feet and the adjacently arranged feet.

In accordance with the invention an electric motor comprises a stator with a winding head, an end shield (43) and a temperature detection unit according to one of the preferred embodiments, wherein the feet bear against the winding head and the plate is operatively connected to the end shield.

As a result of the operative connection between the plate and the end shield, it is possible to exchange the temperature detection unit during the service life of the electric motor. Furthermore, the temperature detection unit can also be inserted only once the stator has been fully cast.

In the case of insertion only once the stator has been cast, it is advantageous to use a negative mask of the temperature detection unit during the casting of the stator.

The cross member can preferably lie on the winding head or can be partially pressed into the winding head.

A cross member lying on the winding head ensures a defined position of the temperature detection unit and can additionally prevent a change in position of the temperature detection unit. In addition, by means of this defined position, the accuracy of the temperature measurement can be improved, since a defined distance between the temperature sensors and the winding head is observed.

A cross member pressed into the winding head can improve the hold of the temperature detection unit in the end shield.

The support element may further preferably be arranged in a space between the winding head and end shield (43).

For example, a wiring plate which connects the star points of the individual windings can be arranged in this space. On the one hand the support element in this space enables the close position of the temperature sensors at the winding heads, and on the other hand the temperature detection unit can also be removed again from this space, since the support element connects the plate to the feet.

In accordance with the invention a vehicle comprises an electric motor according to any one of the preferred embodiments of the electric motor.

DESCRIPTION OF THE FIGURES

FIG. 1 shows a temperature detection unit 1 in a front view, a side view, a plan view and a view from below. The temperature detection unit 1 consists of a plate 15, a support element 17, a cross member 18, and two feet 3, 5.

Figure 1:
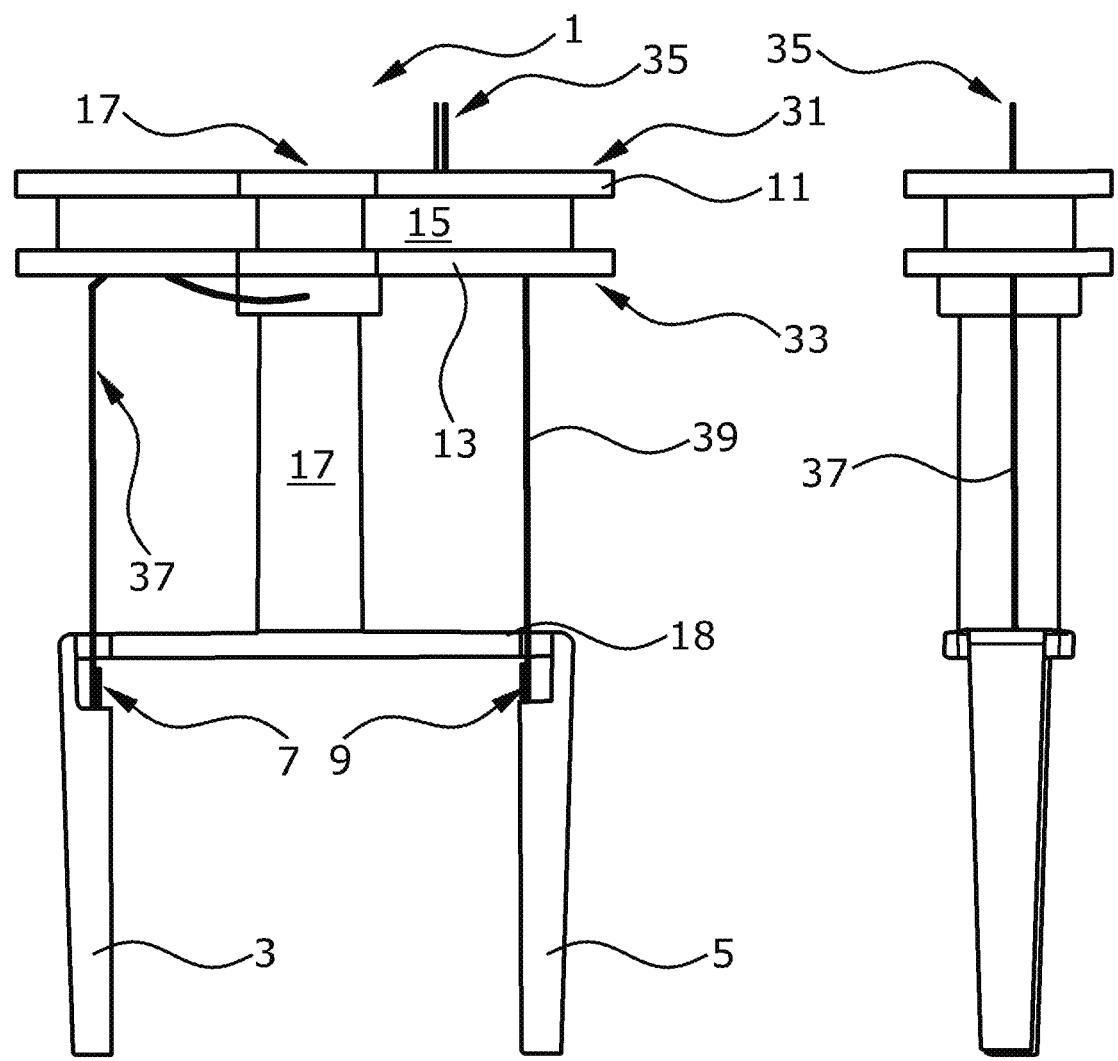
FIG. 1 shows a temperature detection unit in a number of views.
Figure 1:
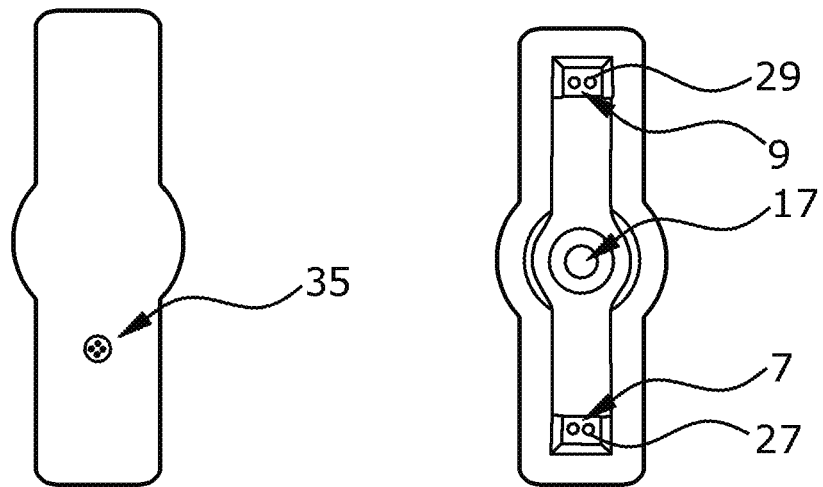

Sealing elements 11, 13 are arranged on the plate 15, one above and one beneath. The sealing elements 11, 13 extend beyond the plate 15 at the sides 31, 33. The support element 17 extends through the plate 15 and the two sealing elements 11, 13.

The plate 15 and the sealing elements 11, 13 also have a recess for a plurality of conductors 35. The conductors 35 leave the plate 15 in the direction of the feet 3, 5. The feet 3, 5 have recesses 7, 9, in which temperature sensors are arranged. The conductors 35 run separately from one another 37, 39 and are connected to the temperature sensors.

In the view from below the two temperature sensors 27, 29 arranged in the recesses 7, 9 in the feet 3, 5 can be seen.

Figure 2:
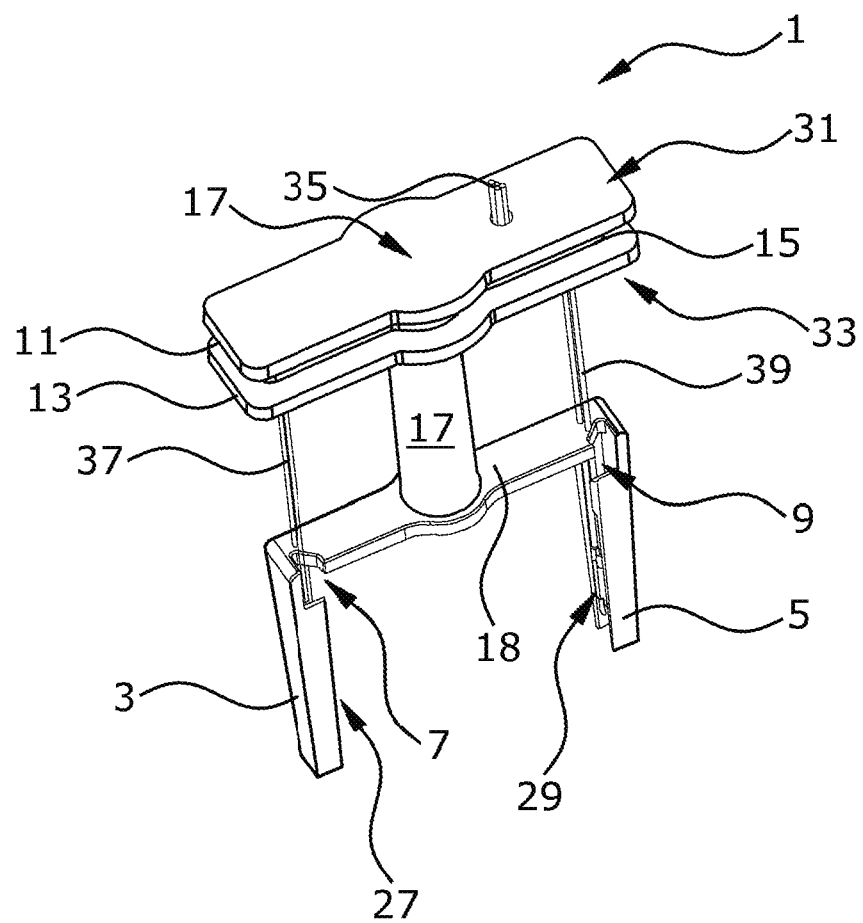
FIG. 2 shows a temperature detection unit in an oblique plan view.

FIG. 2 shows an oblique plan view of the temperature detection unit 1. The recesses 7, 9 in the two feet 3, 5 for the two temperature sensors 27, 29 can be clearly seen. The temperature sensors 27, 29 are connected to a control unit (not shown) via the conductors 35, 37, 39.

Figure 3:
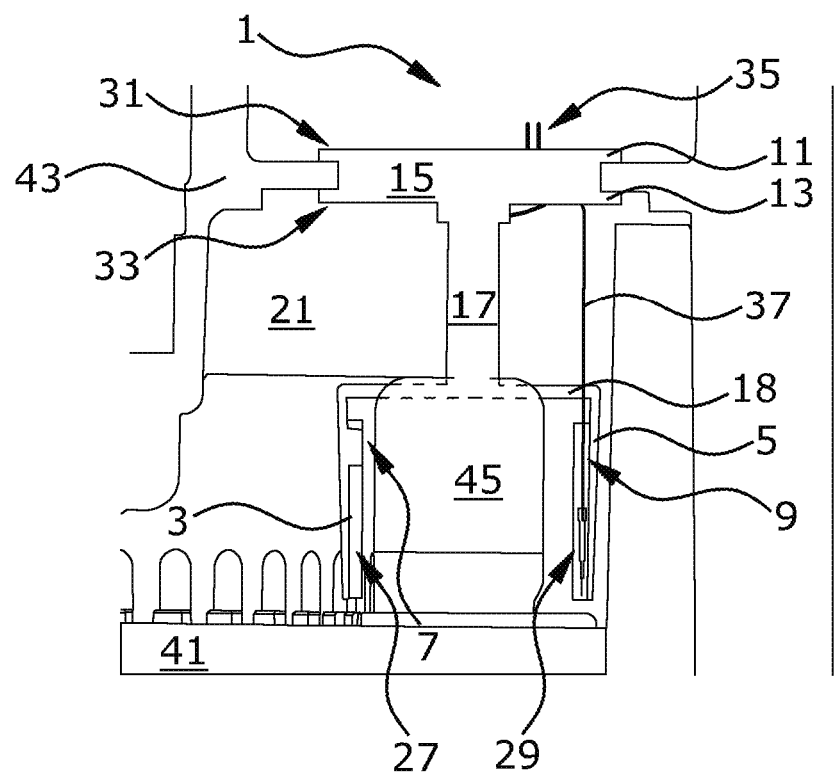
FIG. 3 shows a temperature detection unit installed in an end shield in a cross-section and a plan view.
Figure 3:
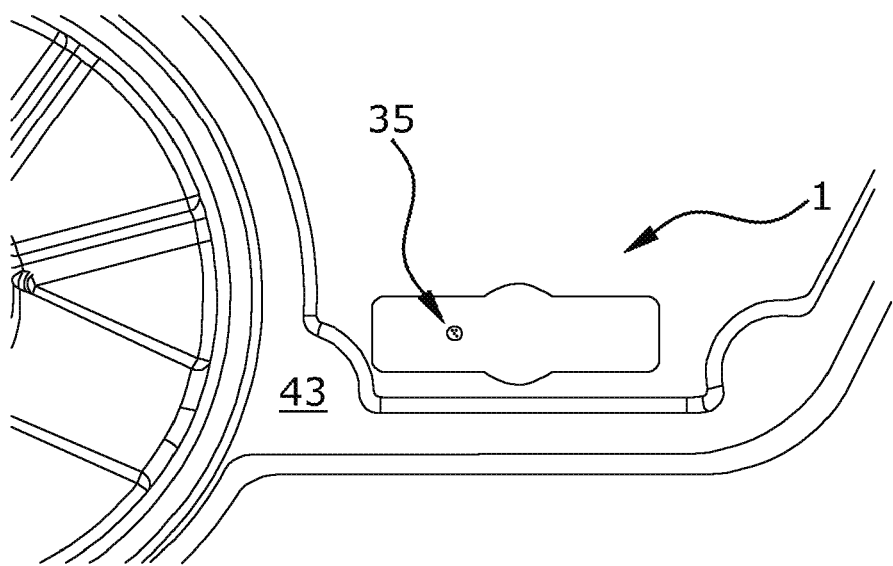

FIG. 3 shows the temperature detection unit 1 installed in an end shield 43 of an electric motor in a cross-section and a plan view. The two feet 3, 5 enclose the winding head 45 of a stator 41. The temperature sensors 27, 29 are thus arranged on the stator 41 in the vicinity of the winding head 45. The cross member 18 is pressed into and fastened in the winding head 45.

With this embodiment it is possible to measure the temperature of the winding at the inner and outer diameter of the winding head 45.

The sealing elements 11, 13, which are arranged on the plate 15, also produce an operative connection to the end shield 43. The infiltration of moisture into the stator 41 is prevented as a result of this operative connection.

For example, the diameter of the sealing elements 11, 14 is greater than the diameter of the plate 15 and the recess within the end shield 43, and therefore the sealing elements 11, 13 overlap the end shield 43 in the regions 31, 33 and thus produce the seal.

The sealing elements 11, 13 and the cross member 18 improve the hold of the temperature detection unit 1 in the end shield 43. The sealing elements are, for example, produced from flexible material. Furthermore, the lower sealing element 13 can prevent the temperature detection unit from falling out of the end shield.

The end shield 43 also has a space 21 between the winding heads 45 and the plate 15. In this region, for example, a wiring plate (not shown) may be arranged. The support element 17 connects the feet 3, 5 via the cross member 18 to the plate, so that the temperature detection unit 1 can be removed from the stator 41 by way of a tensile force on the plate 15, or on the sealing element 11.

Figure 4:
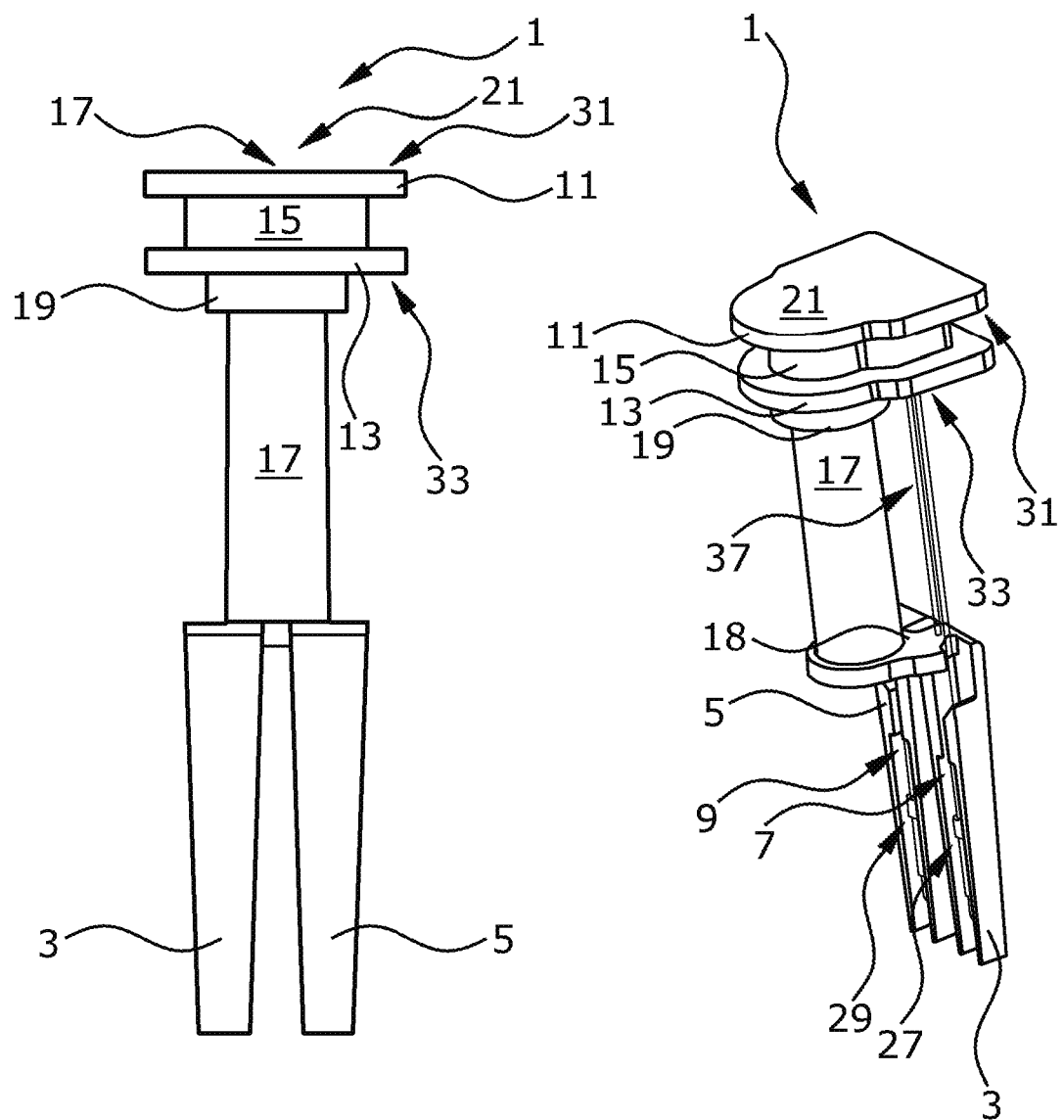
FIG. 4 shows an alternative embodiment of the temperature detection unit in a number of views.
Figure 4:
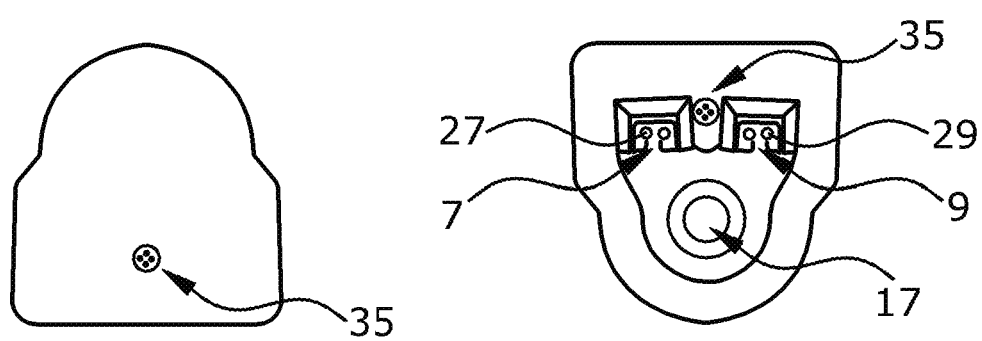

FIG. 4 shows an alternative embodiment of the temperature detection unit 1. As can be seen by a comparison with FIG. 3, the feet 3, 5 are not arranged opposite one another, but adjacently to one another. Accordingly, the temperature sensors 27, 29 are likewise arranged adjacently in different recesses 7, 9.

With this embodiment of the temperature detection unit 1, the temperature of windings on one side of the stator can be measured, i.e. either at the inner diameter or outer diameter of the winding head.

Figure 5:
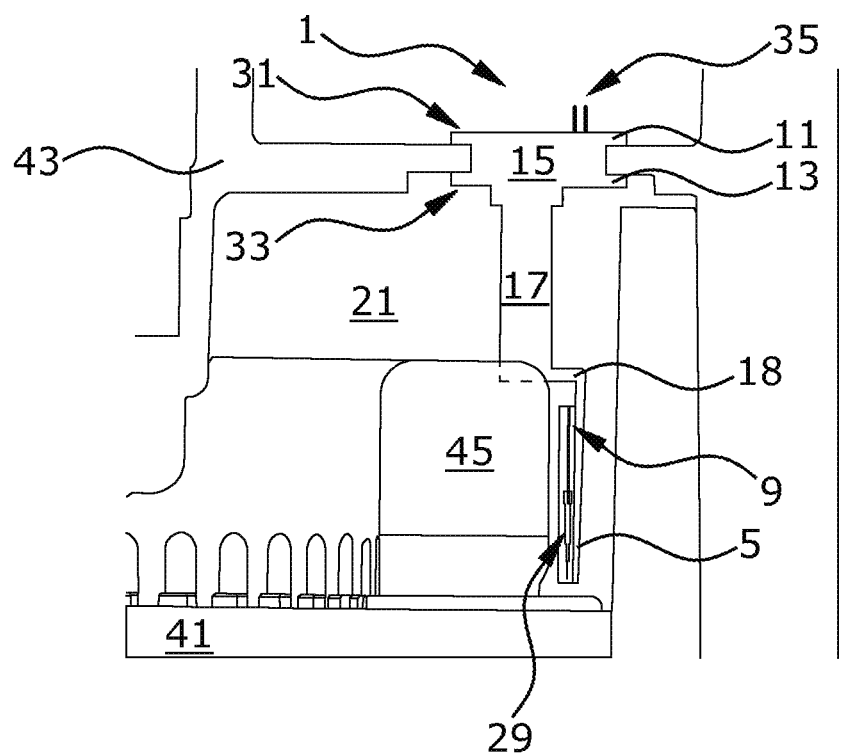
FIG. 5 shows an alternative temperature detection unit installed in an end shield in a cross-section and a plan view.
Figure 5:
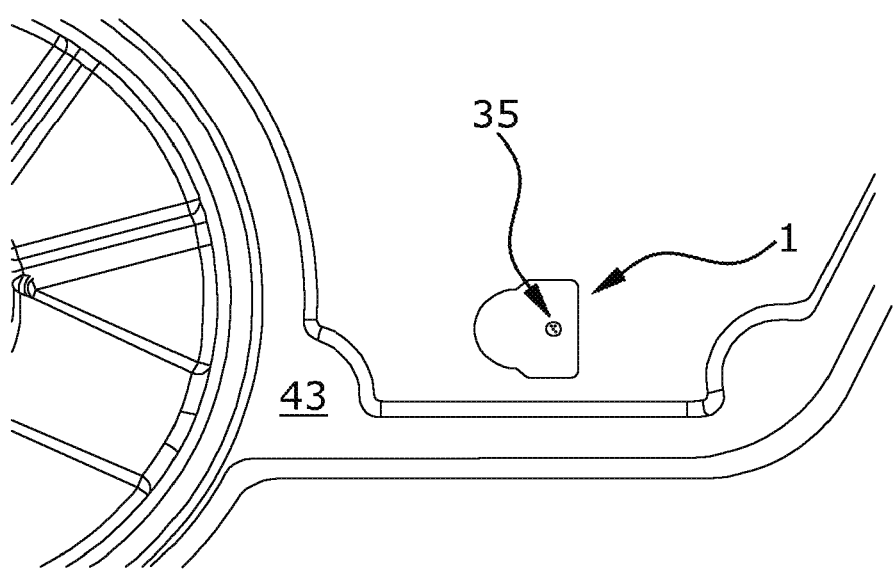

FIG. 5 shows an alternative embodiment of the temperature detection unit 1 installed in an end shield 43 of an electric motor in a cross-section and a plan view. The two feet 3, 5 lie on the outer diameter of the winding head 45 of a stator 41. The temperature sensors 27, 29 are thus arranged on the stator 41 in the vicinity of the winding head 45. The cross member 18 is pressed into and fastened in the winding head 45.

The sealing elements 11, 13, which are arranged on the plate 15, also produce an operative connection to the end shield 43. The infiltration of moisture into the stator 41 is prevented by way of this operative connection.

For example, the diameter of the sealing elements 11, 15 is greater than the diameter of the plate 15 and the recess within the end shield 43, and therefore the sealing elements 11, 13 overlap the end shield 43 in the regions 31, 33 and thus produce the seal.

The sealing elements 11, 13 and the cross member 18 improve the hold of the alternative embodiment of the temperature detection unit 1 in the end shield 43. The sealing elements are for example produced from flexible material. Furthermore, the lower sealing element 13 can prevent the temperature detection unit from falling out of the end shield.

The end shield 43 also has a space 21 between the winding heads 45 and the plate 15. A wiring plate (not shown(can be arranged in this region. The support element 17 connects the feet 3, 5 via the cross member 18 to the plate, so that the temperature detection unit 1 can be removed from the stator 41 by way of a tensile force on the plate 15, or on the sealing element 11.

Of course, the embodiments of FIGS. 1 and 4 can be combined. The combined embodiment has three feet and three temperature sensors, wherein the temperature can be measured at the inner and outer diameter of the winding head and also at different windings on one side.

It is additionally possible to combine the embodiments of FIGS. 1 and 4 so that a temperature detection unit with four feet and four temperature sensors is produced. This embodiment can measure the temperature at the inner and outer diameter of the winding head and also at different windings on both sides of the winding head.

Figure 6:
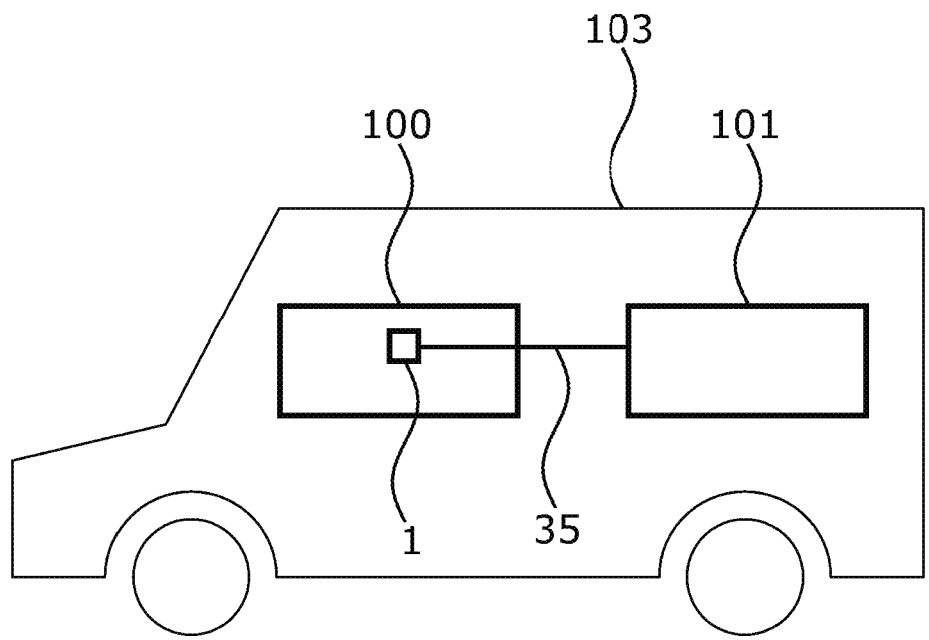
FIG. 6 shows an electric motor with a stator, an end shield and a temperature detection unit in a vehicle.

FIG. 6 shows a vehicle 103 with an electric motor 100 and a temperature detection unit 1. The temperature detection unit 1 is connected to a control unit 101 via at least one conductor 35.

The invention claimed is:

1. A temperature detection unit for a stator of an electric motor, comprising:
   a plate,
   a support element,
   at least two feet,
   at least two temperature sensors,
   wherein the at least two temperature sensors are arranged one on each of the feet, and
   wherein a channel runs through the at least two feet and the support element penetrating the plate and a conductor is guided in the channel.

2. The temperature detection unit according to claim 1, wherein the at least two feet each have a recess and at least one temperature sensor is arranged in each of these recesses.

3. The temperature detection unit according to claim 1, wherein a further sealing element is arranged between the plate and the support element.

4. The temperature detection unit according to claim 1, wherein a cross member is arranged between the support element and the at least two feet and the cross member distances the at least two feet from one another.

5. A temperature detection unit for a stator of an electric motor, comprising:
- a plate,
- a support element,
- at least two feet,
- at least two temperature sensors,
- wherein the at least two temperature sensors are arranged one on each of the feet,
- wherein at least one sealing element is arranged on the plate, and
- wherein the at least one sealing element has a region extending beyond the plate.

6. An electric motor comprising:
- a stator with a winding head,
- an end shield, and
- the temperature detection unit, including:
- a plate,
- a support element,
- at least two feet,
- at least two temperature sensors,
- wherein the at last two temperature sensors are arranged one on each of the feet, and
- wherein the at least two feet bear against the winding head and the plate is operatively connected to the end shield.

7. The electric motor according to claim 6, wherein a cross member lies on the winding head or is pressed partially into the winding head.

8. The electric motor according to claim 6, wherein the support element is arranged in a space between the winding head and the end shield.

9. A vehicle with an electric motor according to claim 6.

* * * * *